(12) United States Patent
Wu

(10) Patent No.: US 6,230,317 B1
(45) Date of Patent: *May 8, 2001

(54) METHOD AND APPARATUS FOR SOFTWARE PIPELINING OF NESTED LOOPS

(75) Inventor: Youfeng Wu, Palo Alto, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,544

(22) Filed: Jul. 11, 1997

(51) Int. Cl.[7] .................................................. G06F 9/45
(52) U.S. Cl. ............................................................ 717/9
(58) Field of Search ................................. 395/709, 700; 375/700; 717/9, 7, 4

(56) References Cited

U.S. PATENT DOCUMENTS

| | | | |
|---|---|---|---|
| 3,787,673 | * 1/1974 | Watson et al. ................... 364/228.1 |
| 4,858,115 | * 8/1989 | Rusterholz et al. ..................... 712/7 |
| 5,119,495 | * 6/1992 | King ..................................... 395/700 |
| 5,450,588 | * 9/1995 | Hoxey .................................. 395/700 |
| 5,485,629 | * 1/1996 | Dulong .................................. 712/24 |
| 5,657,485 | * 8/1997 | Streitenberger et al. ............ 712/245 |
| 5,710,913 | * 1/1998 | Gupta et al. ......................... 712/241 |
| 5,794,029 | * 8/1998 | Babain et al. ....................... 712/241 |
| 5,797,013 | * 8/1998 | Mahadevan et al. ................ 395/709 |
| 5,802,375 | * 9/1998 | Ngo et al. ............................... 717/9 |
| 5,842,022 | * 11/1998 | Nakahira et al. .................... 395/709 |
| 5,881,277 | * 3/1999 | Bondi et al. ......................... 712/239 |
| 6,088,525 | * 7/2000 | Peri ........................................ 717/4 |

OTHER PUBLICATIONS

Title: A loop transformation algorithm for communication overlapping International journal for paralle.*

"Optimal software pipelining of nested loops" by Ramanujam, published by IEEE, 1994.*

"Parallelization of Loops with Exits on Pipelined Architecture", by Tirumalai et al, published at IEEE, 1994.*

"Register Allocation for Modulo Scheduled Loops Strategies, Algorithms and Heuristics", by Tirumalai et al, published at ACM Slgplan, 1992.*

Compilers Principles, Technniques, and Tools, by Aho et al, 1988.*

* cited by examiner

*Primary Examiner*—Mark R. Powell
*Assistant Examiner*—Chameli Chaudhuri Das
(74) *Attorney, Agent, or Firm*—Blakely, Sokloff, Taylor & Zafman LLP

(57) ABSTRACT

A method for executing software pipelined executable code generated by compiling a set of unexecutable instructions having an inner loop and an outer loop is disclosed. Instructions are executed that perform the operations specified in the outer loop using a first storage area. A second storage area is allocated for use when performing the operations specified in the inner loop. Instructions are then executed that perform the operations specified in the inner loop using the second storage area, wherein at least certain storage locations in the first storage area are not alterable while the operations specified in the inner loop are being performed.

19 Claims, 6 Drawing Sheets

METHOD AND APPARATUS FOR SOFTWARE PIPELINING OF NESTED LOOPS

BACKGROUND OF THE INVENTION

1. Field of the Invention

The present invention pertains to the field of compiling source code into executable code in computer systems. More particularly, this invention relates to software pipelining of nested loops.

2. Background of the Related Art

Generally, a compiler is a computer program that compiles or translates a computer program written in source code by a programmer into code that can be executed by a processor. Source code typically includes numerous loops, which are sections of code that may be executed more than once in succession. Many computer programs spend the majority of their execution time in loops. Among the many techniques for improving the execution time of computer programs is increasing the amount of instruction level parallelism that can be used by today's advanced processors.

One technique for increasing instruction level parallelism is software pipelining. Software pipelining is a method that restructures loops so that instructions from various iterations of the loop are executed at the same time.

FIG. 1a shows a scalar schedule of a simple loop consisting of operations A, B, and C. In the scalar schedule 110 each operation is scheduled to be executed one after the other. In the example shown in FIG. 1a each operation is assumed to require one cycle to execute. The operations A, B, and C from the first iteration are labeled A1, B1, and C1, the operations from the second iteration of the loop are labeled A2, B2, and C2, etc. FIG. 1a shows that the scalar schedule 110 requires fifteen cycles to complete.

FIG. 1b shows a software pipeline schedule of the same simple loop described in connection with FIG. 1a, above. In the software pipeline schedule 120, operations from different iterations of the loop are scheduled to be executed during the same cycle. In this example, the software pipeline schedule 120 requires 7 cycles to execute. Thus, a large improvement in execution time is achieved in this example by software pipelining the loop.

Computer programs typically do not consist of only a single loop, or multiple loops at the same level within a hierarchy. Rather, computer programs can include loops within loops (also referred to as nested loops) such that there are loops at numerous levels within a hierarchy. Typical processors/compilers allocate a single storage area for each function or procedure in the executable code regardless of whether that function or procedure contains nested loops.

FIG. 2a illustrates an example of nested loops (an outer loop 210 and an inner loop 215) within a procedure or function written in source code that will be compiled to execute using a single storage area 220. Since a single storage area is allocated, if two or more software pipelined loops from different levels in a loop hierarchy, for example the inner loop 215 and the outer loop 210, are allowed to be active at a given moment in time, the execution of instructions included in the inner loop could overwrite storage locations used for execution of instructions included in the outer loop. As a result, prior methods for software pipelining are not able to pipeline nested loops efficiently, but typically pipeline the innermost loop(s) (i.e., the loop(s) at the lowest level of the hierarchy) and schedule the outer loops in a scalar fashion.

Computer programs spend significant execution time in other than the innermost loops, and as a result, pipelining only the innermost loops limits the amount of execution time improvement that can be achieved through prior software pipelining techniques. Therefore, a method for software pipelining nested loops is desirable.

SUMMARY OF THE INVENTION

A method and apparatus for executing software pipelined executable code generated by compiling code having an inner loop and an outer loop is disclosed. Instructions are executed that perform the operations specified in the outer loop portion of the code using a first storage area. A second storage area is allocated for use when performing the operations specified in the inner loop. Instructions are then executed that perform the operations specified in the inner loop using the second storage area, wherein at least certain storage locations in the first storage area are not alterable while the operations specified in the inner loop are being performed.

DETAILED DESCRIPTION

A method and apparatus for software pipelining of nested loops is disclosed. In the following description, for the purposes of explanation, specific details are set forth to provide a thorough understanding of the present invention. However, it will be obvious to one skilled in the art that these specific details are not required to practice the present invention. In other instances, well known methods, devices, and structures are not described in particular detail in order to avoid obscuring the invention.

Overview

The invention solves the problem of not being able to software pipeline loops other than the innermost loops. To allow for the software pipelining of nested loops, the invention protects at least certain storage locations used for executing operations from the outer loops from being written by operations from inner loops. In one embodiment of the invention, each loop in a loop hierarchy is allocated a separate storage area. In this manner, the operations specified in inner loops can modify storage locations in their storage areas without altering the contents of the storage locations in the storage areas allocated for use by operations specified in outer loops. Since the instructions specified in the inner loops cannot alter the contents of the storage locations in the outer loop's storage area, each of the inner loops and the outer loops may be software pipelined. Software pipelining of inner and outer loops allows for significant improvement in computer program execution times.

The invention provides for software pipelining of nested loops that include unexecutable instructions. Unexecutable instructions include any instructions that are not in a form ready to be fetched and executed by a processor, including but not limited to high-level source code (such as code written in C++ or other high-level programming languages), copies of high-level source code, and instructions that have undergone one or more steps of a compilation process, which may be referred to as intermediate operations.

One Embodiment of the Invention

In one embodiment of the invention, for a computer program written in high-level source code (such as code written in the "C++" programming language) containing nested loops, each inner loop is converted into a procedure call. Compilation and execution of the procedure calls result in inner loops being allocated storage areas separate from those allocated for use by operations specified in outer loops. The procedure calls need not follow any particular convention. The term "procedure call" as used herein is intended to include any device, means, or method in which storage areas can be allocated. While one embodiment is described in which inner loops are converted into procedure calls, alternative embodiments can use any set of instructions that cause the processor to protect at least certain outer loop storage locations from being overwritten by the inner loop. For example, a single new instruction can be used.

Figure 1A:
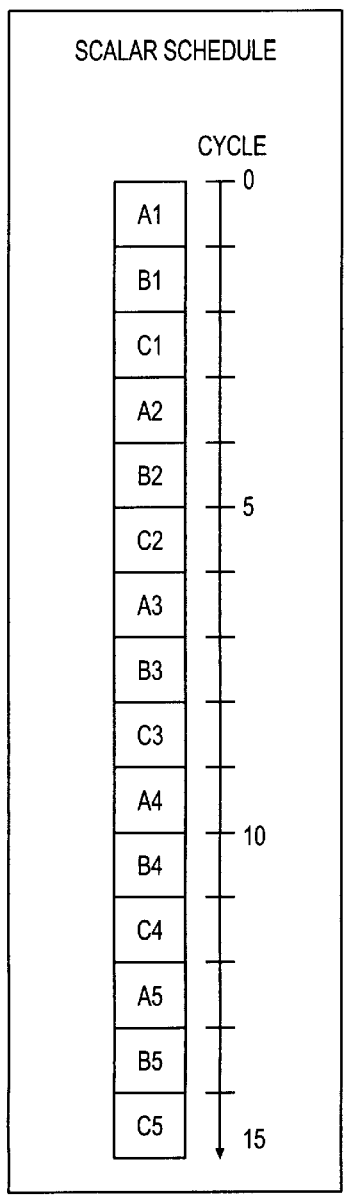
FIG. 1a shows a scalar schedule of a loop implemented in accordance with the teachings of the related art.
Figure 1B:
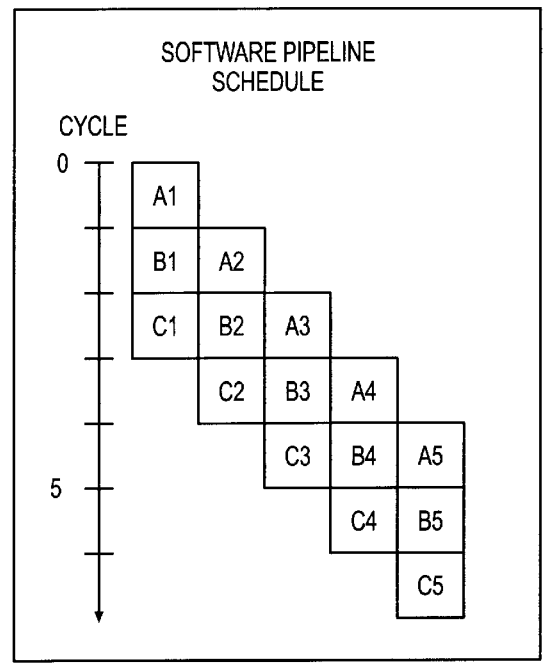
FIG. 1b shows a software pipeline schedule implemented in accordance with the teachings of the related art.
Figure 2A:
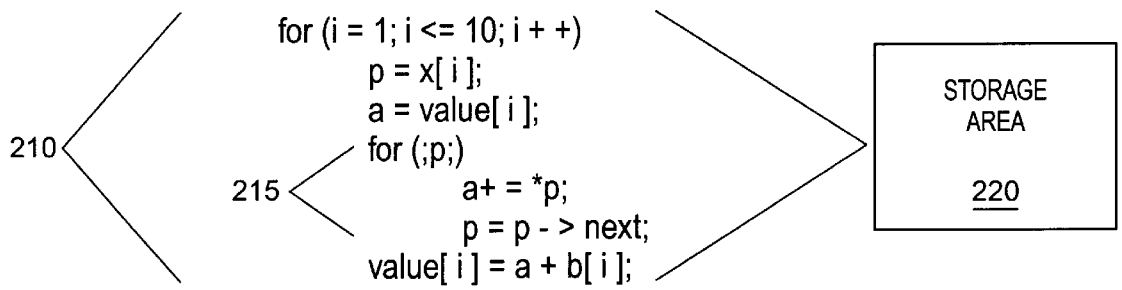
FIG. 2a depicts an inner loop and an outer loop sharing a storage area in accordance with the teachings of the related art.
Figure 2B:
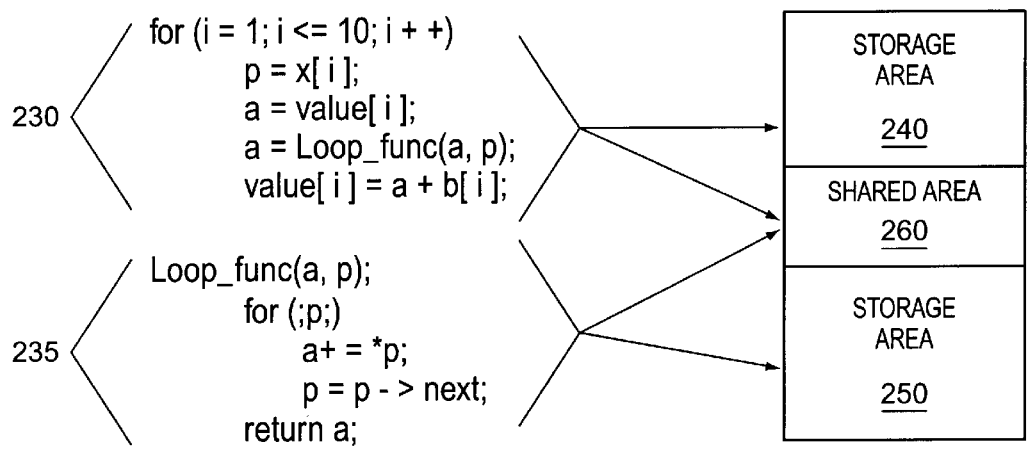
FIG. 2b shows an outer loop working out of a storage area and an inner loop that has been converted to a function call working out of a separate storage area in accordance with one embodiment of the invention.

FIG. 2b illustrates an altered version of the source code from FIG. 2a that will be compiled to execute the inner and outer loops using separate storage areas in accordance with one embodiment of the invention. FIG. 2b shows an outer loop 230 working out of a storage area 240 and an inner loop 235 having been converted to a procedure call and working out of a storage area 250. The outer loop 230 is functionally equivalent to the outer loop 210 in FIG. 2a. The inner loop 235, now in the form of a procedure, is functionally equivalent to the inner loop 215 in FIG. 2a. The outer loop 230 is allocated the storage area 240 and the inner loop 235 is allocated the storage area 250. Both the outer loop 230 and the inner loop 235 are allowed to access a shared area 260. The shared area 260 allows for efficient passing of parameters between the outer loop 230 and the inner loop 235. For example, the outer loop 230 can pass a parameter to the inner loop 235 by placing the parameter in the shared area 260. The storage area 240, the storage area 250, and the shared area 260 are typically implemented as registers located in a processor, although other storage devices are possible.

While FIG. 2b shows only a single inner loop and a single outer loop, any number of nested loops can be used with the present invention. Thus, the invention is not limited to a two level loop hierarchy, but can be used to software pipeline any number of levels of a loop hierarchy.

Figure 3:
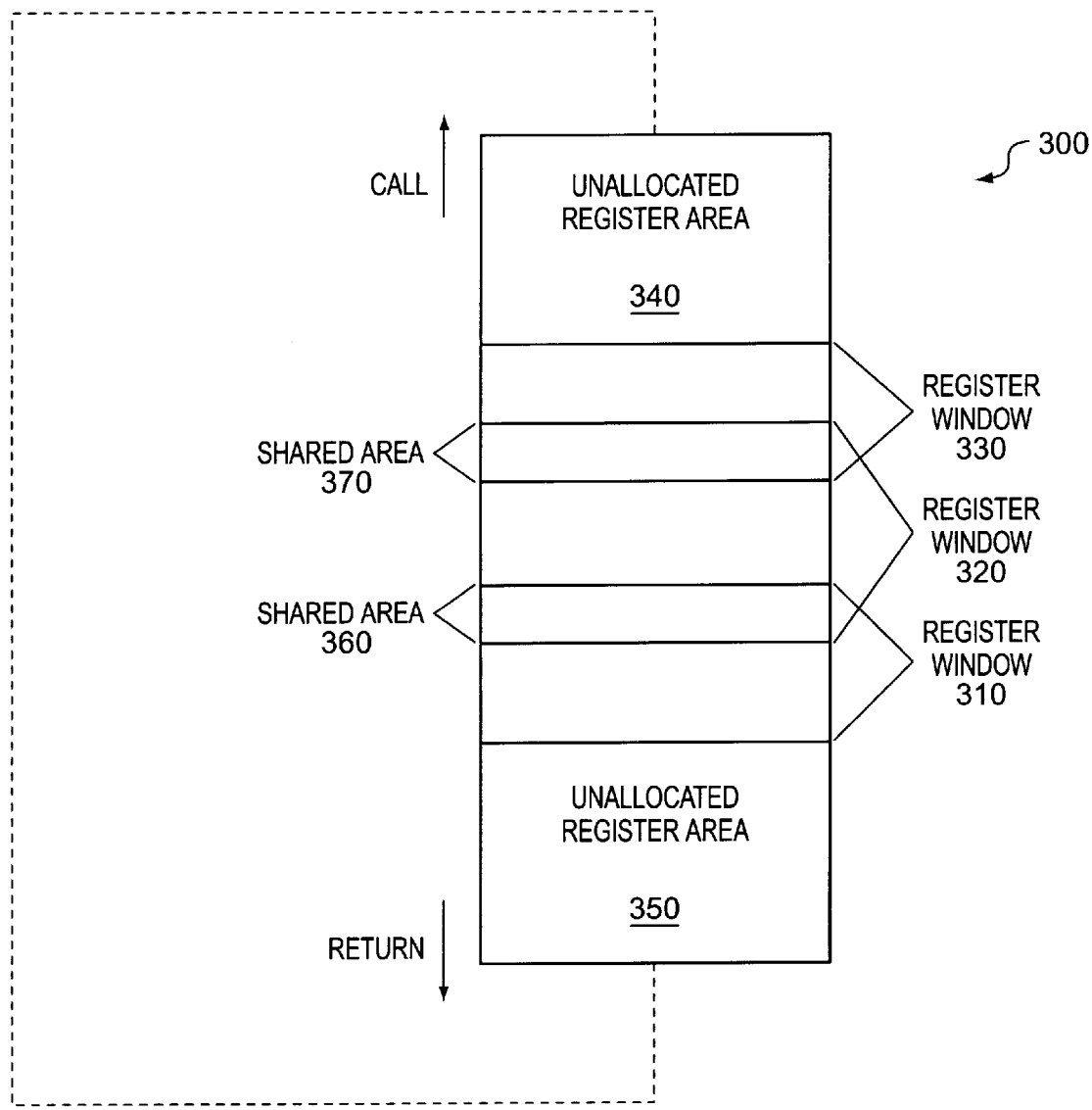
FIG. 3 shows a storage area arrangement implemented in accordance with one embodiment of the invention.

FIG. 3 illustrates one example of a storage area arrangement that allows for pipelining of nested loops implemented in accordance with the teachings of the invention. This arrangement allows for every nested loop to have a separate storage area and also allows for efficient passing of parameters between procedures or loops using shared areas. FIG. 3 shows a set of physical registers 300 which operate as a circular buffer containing the most recently formed "register windows". A register window is a range of registers allocated to a procedure (the term procedure is used herein to include functions). In this example three register windows are shown, a register window 310, a register window 320, and a register window 330. The register windows 310, 320, and 330 are allocated to procedures A, B, and C, respectively. Further, in this example the register windows 320 and 330 are formed by procedure A calling procedure B and procedure B calling procedure C. These procedures can be regular procedures, converted inner loops, etc. The register windows 310 and 320 overlap, forming a shared area 360. The register windows 320 and 330 overlap, forming a shared area 370. Procedures A and B can pass parameters by using the shared area 360 which is alterable during execution of both procedures A and B. Similarly, procedures B and C can pass parameters by using the shared area 370 which is alterable during execution of both procedures B and C. While one embodiment is described in which the shared areas are provided by overlapping the register windows, alternative embodiments may not provide a shared area(s) and/or provide for the shared area(s) any number of other ways. For example, another way to provide for a shareable storage area(s) is to have a separate set of registers that are alterable during execution of all procedures.

The circular buffer arrangement allows for any number of nested loops to each have their own register window with a portion of that window shared with the calling procedure. As more register windows are required for additional loops, register windows are formed first in an unallocated register area 340 and then in an unallocated register area 350. If even more register windows are needed and all of the physical register set 300 is allocated, the contents of previously allocated windows can be moved to another storage area (i.e., swapped out), thereby allowing the allocation of additional register windows. While one embodiment is described that has a circular buffer, alternative embodiments could provide the separate storage areas any number of ways. For example, multiple separate register files could be provided. As another example, a single set of registers could be used and the contents copied to another storage area (cache, main memory) on each procedure call.

Figure 4:
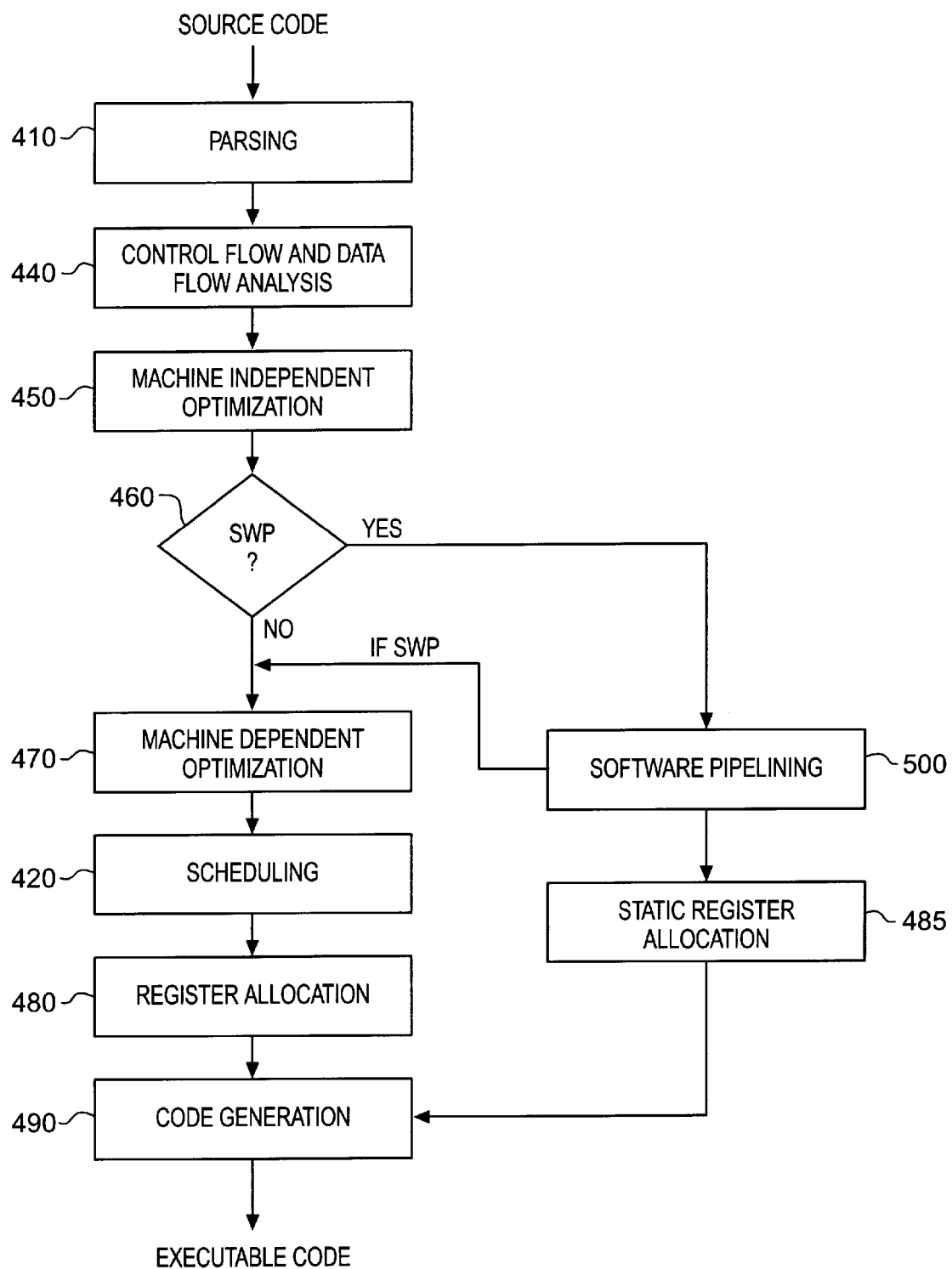
FIG. 4 is a flow diagram of a compiler method implemented in accordance with one embodiment of the invention.

FIG. 4 is a flow diagram of a compiler method implemented in accordance with one embodiment of the invention. In this example, source code is processed on a procedure-by-procedure basis. At parsing step 410, a procedure from the source code is parsed resulting in the output of a set of intermediate operations that correspond to the procedure. Intermediate operations include any operations or instructions that are lower-level than the high-level source code but not executable by a processor. After parsing, control flow and data flow analysis is performed at step 440. Following control flow and data flow analysis, various machine independent optimizations are performed at step 450. Parsing step 410, control flow and data flow analysis step 440, and machine independent optimization step 450 are intended to represent broad categories of steps and methods. Techniques for performing these steps are well known. From step 450, control passes to step 460.

At step 460, each loop in the procedure is analyzed in order to determine whether software pipelining will be attempted. This determination is made on a loop-by-loop basis. The determination may include an analysis to ascertain the likelihood that software pipelining will improve the execution time of the loop. The determination may also include an analysis of results from any previous compiler runs for the loop. The determination may also be based on a specification by the user that software pipelining should be attempted for all loops. Each loop is flagged as either a software pipelining candidate or a non-candidate. The term "flagged" as used herein is meant to include any device or method for identifying a loop as a software pipelining candidate or non-candidate. For loops that are flagged as non-candidates, control passes to machine dependent optimization step 470. For loops flagged as software pipelining candidates, control passes to step 500.

At step 500, software pipelining is attempted for loops within the procedure that have been flagged as software pipelining candidates. Where the software pipelining attempt fails for a loop, machine dependent optimization step 470 follows software pipelining step 500. However, if the software pipelining is successful, control passes to static register allocation step 485. Exemplary techniques for performing the software pipelining of step 500 will be described with reference to FIG. 5.

Following machine dependent optimization step 470 are scheduling step 420, register allocation step 480, and code generation step 490. Machine dependent optimization step 470, scheduling step 420, register allocation step 480, static register allocation step 485 and code generation step 490 are intended to represent broad categories of steps and methods. Techniques for performing these steps are well known.

Figure 5:
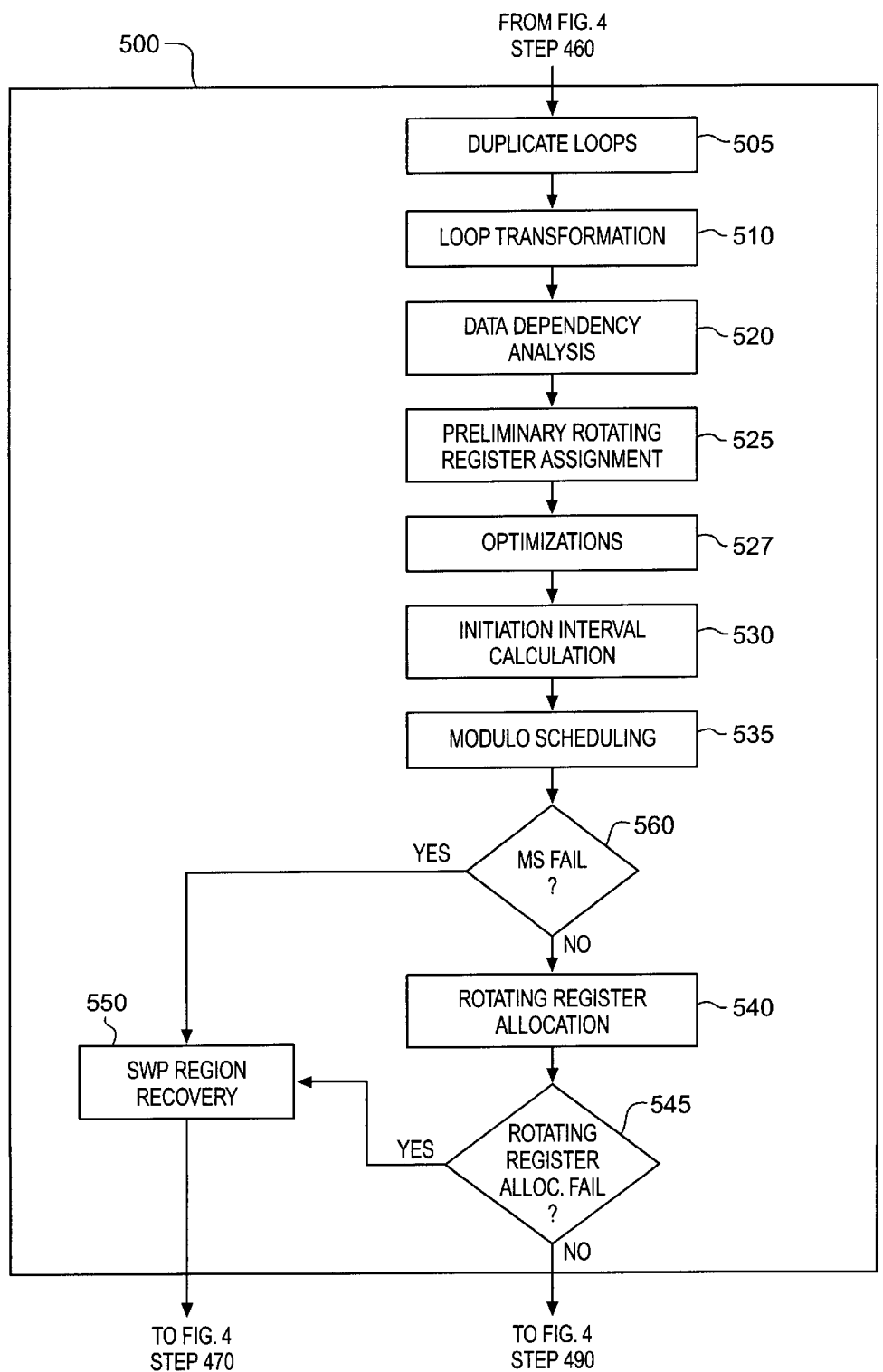
FIG. 5 is a flow diagram of the software pipelining step of a compiler method implemented in accordance with one embodiment of the invention.

FIG. 5 is a flow diagram of software pipelining step 500 implemented in accordance with one embodiment of the invention. At software pipelining step 500, the loops within the procedure that have been flagged as software pipelining candidates are processed on a level-by-level basis according to the particular loop hierarchy of the procedure. The loops are processed one level at a time, proceeding either from the inner-most loop hierarchy level to the outer-most level or from the outer-most loop hierarchy level to the inner-most level.

For this embodiment, in duplicate loops step 505, a copy is made of all loops that are to be software pipelined. If one or more of the loops cannot be software pipelined, the loop copies are used to restore those loops in software pipelining region recovery step 550 to the state they were in after machine independent optimization step 450.

Following duplicate loops step 505, various loop transformations are performed at step 510. In one embodiment of the invention, the transformations include converting inner loops into procedure calls. Another possible transformation is the insertion of communication code which facilitates passing parameters between outer and inner loops. Also, loops which test loop conditions at the top of the loop may be converted to loops which test loop conditions at the bottom of the loop. Further, loops containing multiple exit points may be converted to loops with a single exit point. Another possible transformation includes predication. Predication involves assigning a boolean value to each operation to be executed. An operation is conditionally executed based on the value of the predicate associated with that operation. This enables modulo scheduling of loops containing conditional branches. Predication allows the elimination of all branches from the loop body. Of course, other transformations may be performed.

After loop transformation step 510 is data dependency analysis step 520. Data dependency analysis involves deciding which operations must follow other operations. Data dependency analysis step 510 is intended to represent a broad category of steps and methods. Techniques for performing these steps and methods are well known.

Preliminary rotating register assignment step 525 follows data dependency analysis step 520. Rotating registers allow for the changing of register allocation in order to avoid storage conflicts between operations in different iterations of a loop and also increases instruction parallelism within the loop. In step 525, virtual registers specified in the intermediate operations are assigned to one of thee categories: (1) must be rotating register; (2) may be a rotating register; and (3) must be a static register. The final register assignment occurs at rotating register allocation step 540 and static register allocation step 485.

Following preliminary rotating register assignment step 525 is optimization step 527. Optimization step 527 involves removing dependencies, and step 527 in intended to represent a broad category of steps and methods of dependency reduction. Techniques for performing these steps and methods are well know.

Following optimization step 527 is initiation interval calculation step 530. The initiation interval is the number of operation issue cycles between the initiation of successive iterations in a modulo schedule. Several methods exist for calculating or estimating initiation intervals. Initiation interval step 530 is intended to represent a broad category of methods or steps for calculating or estimating an initiation interval.

Modulo scheduling step 535 follows initiation interval calculation step 530. Modulo scheduling is well known in the art, and modulo scheduling step 535 is intended to represent a broad category of scheduling steps and methods.

Step 560 depicts that if modulo scheduling step 535 is successful, rotating register allocation step 540 follows. In step 540, rotating register allocation is finalized. Further, in rotating register allocation step 540, the appropriate number of rotating registers and the appropriate sizes of the storage areas to be used by each loop are determined and the set of intermediate operations is modified in order to provide operations to allocate the storage areas.

Step 545 depicts that if the rotating register allocation step 540 fails, control passes to step 550. Rotating register allocation can fail if the required number of rotating registers exceeds the physical limitations of a particular processor. If rotating register allocation is successful, control passes to static register allocation step 485. The virtual registers specified in the set of intermediate operations that were assigned to the "must be a static register" category in preliminary rotating register assignment step 525 are allocated in step 485.

If rotating register allocation step 540 or modulo scheduling step 535 fails, and therefore software pipelining fails, the loop copies generated at step 505 are used to restore the failing loops to the state they were in after machine independent optimization step 450. This process occurs at recovery step 550. Other recovery methods are possible, including maintaining a history of changes to the loops and then reconstructing the loops. Following step 550, the process reverts to more traditional optimizations at step 470, depicted in FIG. 4.

While methods of implementing the invention are illustrated in FIGS. 4 and 5, alternative embodiments can use different methods (e.g., different steps, different ordering of the steps, etc.). Thus, the invention is not limited to the methods described with reference to FIGS. 4 and 5.

Figure 6:
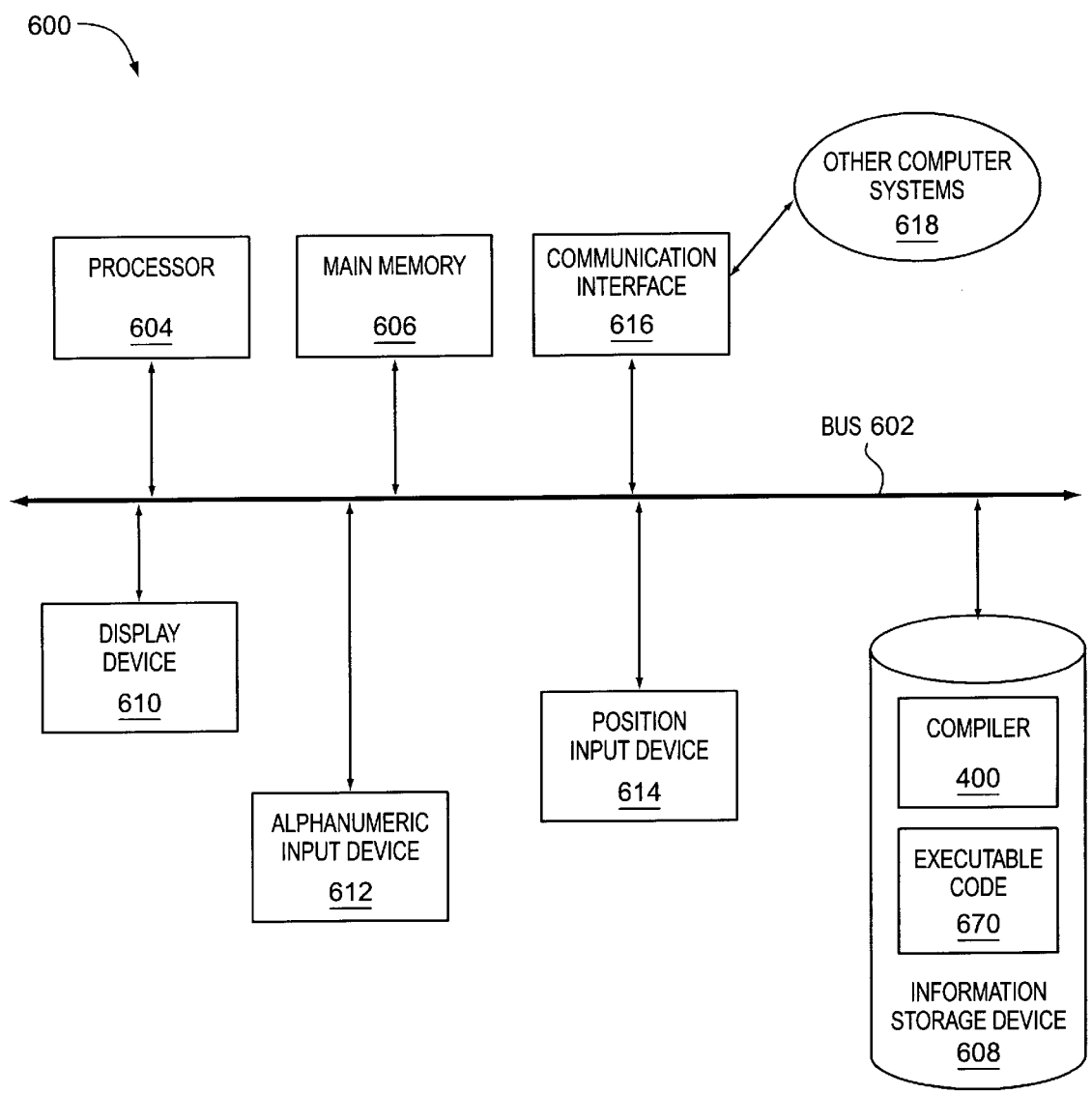
FIG. 6 depicts a computer system including a compiler implemented in accordance with one embodiment of the invention.

FIG. 6 depicts an exemplary computer system 600 including a compiler implemented in accordance with one embodiment of the invention. Computer system 600 typically includes a bus 602 for communicating information, such as instructions and data. The system further includes a processor 604, coupled to the bus 602, for processing information according to programmed instructions, a main memory 606 coupled to the bus 602 for storing information for processor 604, and an information storage device 608 coupled with the bus 602 for storing information. In the case of a desk-top design for computer system 600, the above components are typically located within a chassis (not shown).

The processor 604 could be an 80960, 386, 486, Pentium® processor, Pentium® Pro processor, or Pentium® II processor made by Intel Corp., among others, including processors that are compatible with those listed above. The processor 604 typically includes a plurality of pipelines for parallel and overlapping execution of operations. The main memory 606 could be a random access memory (RAM) to store dynamic information for processor 604, a read-only memory (ROM) to store static information and instructions for processor 604, a combination of both types of memory, etc.

Information storage device 608 could be any medium for storage of computer readable information. Suitable candidates include a read-only memory (ROM), a hard disk drive, a disk drive with removable media (e.g., a floppy magnetic disk or an optical disk), a tape drive with removable media (e.g., magnetic tape), a synchronous DRAM or a flash memory (i.e., a disk-like storage device implemented with flash semiconductor memory). A combination of these, or other devices that support reading or writing computer readable media, could be used. The information storage device 608 has stored therein a compiler 400 and/or executable code 670. The compiler 400 operates to software pipeline nested loops in source code or a set of intermediate operations as described herein. The executable code 670 is generated by the compiler 400 compiling source code or a set of intermediate operations that contain at least one inner loop. The inner and outer loop are software pipelined in executable code 670.

Optional input/output devices of the computer system 600 typically comprise a display device 610, an alphanumeric input device 612, a position input device 614 and a communications interface 616, each of which is coupled to the bus 602. If the data storage device 608 supports removable media, such as a floppy disk, it may also be considered an input/output device.

The display device 610 may be a liquid crystal display, a cathode ray tube, or any other device suitable for creating graphic images or alphanumeric characters recognizable to the user. The communications interface 616 (e.g., modem, network interface, etc.) communicates information between other computer systems 618 and the processor 604 or the main memory 606.

The alphanumeric input device 612 typically is a keyboard with alphabetic, numeric, and function keys, but it may be a touch sensitive screen or other device operable to input alphabetic or numeric characters.

The position input device 614 allows a computer user to input command selections, such as button presses, and two dimensional movement, such as of a visible symbol, pointer or cursor on the display device 610. The position input device 614 typically is a mouse or a trackball, but any device may be used that supports signaling intended movement of a user-specified direction or amount, such as a joystick or special keys or key sequence commands on the alphanumeric input device 612.

It will be clear to one skilled in the art that the invention can operate upon a wide range of programmable computer systems, not just the example computer system 600.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A method for executing software pipelined executable code generated by compiling source code having an inner loop and an outer loop, the method comprising:

executing instructions in the executable code that perform operations specified in the outer loop using a first storage area;

allocating a second storage area for use when performing operations specified in the inner loop; and executing instructions in the executable code that perform the operations specified in the inner loop using the second storage area, wherein at least certain storage locations in the first storage area are not alterable while the operations specified in the inner loop are being performed.

2. The method of claim 1, wherein the step of allocating a second storage area for use when performing operations specified in the inner loop comprises performing a procedure call.

3. The method of claim 1, further comprising converting the inner loop into a procedure call.

4. A method for generating a set of executable instructions by compiling a set of unexecutable source code instructions having an inner loop and an outer loop, the method comprising:

determining said set of unexecutable source code instructions includes an outer loop and an inner loop; and generating executable instructions that when executed perform the operations specified in the outer and inner loops using respectively a first and a second storage area wherein at least certain storage locations in the first storage area are not alterable while the operations specified in the inner loop are being executed.

5. The method of claim 4 further comprising:

adding to the set of unexecutable source code instructions a first additional instruction that when executed allocates a first storage area for use when executing the outer loop; and adding to the set of unexecutable source code instructions a second additional instruction that when compiled and executed allocates a second storage area for use when executing the inner loop wherein at least certain storage locations in the first storage area are not alterable while the operations specified in the inner loop are being executed.

6. The method of claim 5 further comprising scheduling an instruction from a first iteration of the outer loop and an instruction from a second iteration of the outer loop to be executed concurrently.

7. The method of claim 5, wherein said adding to the set of unexecutable source code instructions a second additional instruction that when compiled and executed allocates a second storage area for use when executing the inner loop comprises converting the inner loop into a procedure call.

8. The method of claim 4, wherein the first set of registers includes a plurality of registers that are not included in the second set of registers.

9. A machine-readable medium having stored thereon data representing a sequence of instructions, the sequence of instructions which, when executed by a computer system, cause the computer system to:

determine a set of unexecutable source code instructions including an outer loop and an inner loop; and generate executable instructions that when executed perform the operations specified in the outer and inner loops using respectively a first and a second storage area wherein at least certain storage locations in the first storage area are not alterable while the operations specified in the inner loop are being executed.

10. The machine-readable medium of claim 9 further comprising:

adding to the set of unexecutable source code instructions a first additional instruction that when compiled and executed allocates a first storage area for use when executing the outer loop; and adding to the set of unexecutable source code instructions a second additional instruction that when compiled and executed allocates a second storage area for use when executing the inner loop wherein at least certain storage locations in the first storage area are not alterable while the operations specified in the inner loop are being executed.

11. The machine-readable medium of claim 10 further comprising scheduling an instruction from a first iteration of the outer loop and an instruction from a second iteration of the outer loop to be executed concurrently.

12. The machine-readable medium of claim 10, wherein adding to the set of unexecutable source code instructions a second additional instruction that when compiled and executed allocates a second storage area for use when executing the inner loop comprises converting the inner loop into a procedure call.

13. The machine-readable medium of claim 9, wherein the first set of registers includes a plurality of registers that are not included in the second set of registers.

14. A computer system comprising:

a processor having circuitry for allocating a first and a second storage area, the processor including circuitry for communicating between the first and second storage areas, the first and second storage areas each including a plurality of registers; and a storage device coupled to the processor and having stored therein executable code, the executable code being compiled from source code, the source code including an inner loop and an outer loop, the executable code including instructions that cause the processor to perform the operations specified in the outer loop portion of the source code using the first storage area, at least one instruction that causes the processor to allocate the second storage area to perform the operations specified in the inner loop, and instructions that cause the processor to perform the operations specified in the inner loop using the second storage area, wherein at least certain storage locations in the first storage area are not alterable while the processor is executing the inner loop.

15. The computer system of claim 1, wherein the circuitry for communicating between the first and second storage areas includes a shared register area that is alterable while the processor is performing operations specified in each of the inner and outer loops.

16. A method comprising:

pipelining a first loop at a first level of a loop hierarchy by scheduling an instruction from a first iteration of the first loop and an instruction from a second iteration of the first loop to be executed concurrently;

pipelining a second loop at a second loop at a second level of a loop hierarchy, the second loop nested within the first loop;

executing instructions in the executable code that perform operations specified in the first loop using a first storage area;

allocating a second storage area for use when performing operations specified in the second loop; and executing instructions in the executable code that perform the operations specified in the second loop using the second storage area, wherein at least certain storage locations in the first storage area are not alterable while the operations specified in the second loop are being performed.

17. The method of claim 16, further comprising performing one or more loop transformations on the second loop including converting the second loop into at least one procedure call.

18. A machine-readable medium having stored thereon data representing a sequence of instructions which, when executed by a general purpose computer, cause the computer to:

pipeline a first loop at a first level of a loop hierarchy by scheduling an instruction from a first iteration of the first loop and an instruction from a second iteration of the first loop to be executed concurrently;

pipeline a second loop as a second level of a loop hierarchy, the second loop nested within the first loop;

execute instructions in the executable code that performs operations specified in the first loop using a first storage area;

allocate a second storage area for use when performing operations specified in the second loop; and executing instructions in the executable code that perform the operations specified in the second loop using the second storage area, wherein at least certain storage locations in the first storage area are not alterable while the operations specified in the second loop are being performed.

19. The machine-readable medium of claim 18, further comprising performing one or more loop transformations on the second loop including converting the second loop into at least one procedure call.

* * * * *

UNITED STATES PATENT AND TRADEMARK OFFICE
CERTIFICATE OF CORRECTION

PATENT NO.    : 6,230,317 B1
DATED         : May 8, 2001
INVENTOR(S)   : Youfeng Wu It is certified that error appears in the above-identified patent and that said Letters Patent is hereby corrected as shown below:

Column 10,
Line 3, delete "claim 1" and insert -- claim 14 --.

Signed and Sealed this

Twenty-seventh Day of May, 2003

JAMES E. ROGAN
*Director of the United States Patent and Trademark Office*